US006239429B1

(12) United States Patent
Blessing et al.

(10) Patent No.: US 6,239,429 B1
(45) Date of Patent: May 29, 2001

(54) QUADRUPOLE MASS SPECTROMETER ASSEMBLY

(75) Inventors: James E. Blessing, Morgan Hill, CA (US); Jonathan Palk, Sandbach (GB)

(73) Assignee: MKS Instruments, Inc., Hanover, MA (US)

(*) Notice: Subject to any disclaimer, the term of this patent is extended or adjusted under 35 U.S.C. 154(b) by 0 days.

(21) Appl. No.: 09/179,124

(22) Filed: Oct. 26, 1998

(51) Int. Cl.$^7$ .............................. B01D 59/44; H01J 49/00

(52) U.S. Cl. ........................... 250/292; 250/281; 250/427

(58) Field of Search ..................................... 250/281, 292, 250/423 R, 427

(56) References Cited

U.S. PATENT DOCUMENTS

| | | | |
|---|---|---|---|
| Re. 35,701 | 12/1997 | Foley | 250/292 |
| 4,179,615 | 12/1979 | Kraus et al. | 250/489 |
| 4,700,069 | 10/1987 | Ino et al. | 250/292 |
| 4,771,172 | 9/1988 | Weber-Grabau et al. | 250/282 |
| 4,975,576 | 12/1990 | Federer et al. | 250/282 |
| 5,017,779 | 5/1991 | Smith, Jr. et al. | 250/283 |
| 5,028,777 | 7/1991 | Franzen et al. | 250/282 |
| 5,107,109 | 4/1992 | Stafford, Jr. et al. | 250/282 |
| 5,136,161 | 8/1992 | Logan | 250/293 |
| 5,153,432 | 10/1992 | Devant et al. | 250/293 |
| 5,373,157 | 12/1994 | Hiroki et al. | 250/292 |
| 5,384,461 | 1/1995 | Jullien et al. | 250/292 |
| 5,401,962 | 3/1995 | Ferran | 250/292 |
| 5,412,207 | 5/1995 | Micco et al. | 250/288 |
| 5,420,425 | 5/1995 | Bier et al. | 250/292 |
| 5,459,315 | 10/1995 | Waki | 250/292 |
| 5,525,084 | 6/1996 | Broadbent et al. | 445/49 |
| 5,561,292 * | 10/1996 | Buckley et al. | 250/427 |
| 5,572,022 | 11/1996 | Schwartz et al. | 250/282 |
| 5,596,193 | 1/1997 | Chutjian et al. | 250/292 |
| 5,613,294 | 3/1997 | Ferran | 29/825 |
| 5,616,919 | 4/1997 | Broadbent et al. | 250/292 |
| 5,719,393 | 2/1998 | Chutjian et al. | 250/292 |

* cited by examiner

*Primary Examiner*—Bruce C. Anderson
(74) *Attorney, Agent, or Firm*—Stetina Brunda Garred & Brucker

(57) ABSTRACT

A small, high performance quadrupole mass analyzer (QMA) that is simple to manufacture and assemble with high precision due to the design of key components using high precision circular geometries that are easily machined. The QMA has a single, cylindrical insulating retainer block, which supports at the four filter rods at their mid-points and precisely positions them in the conventional quadrupole configuration. The rods are held in the retainer block by radial fasteners that extend in radially from the outer diameter of the retainer block. These fasteners also constitute the electrical connection for each rod. The retainer block has precise outer diameter for alignment with the entrance and exit electrodes, each of which has a lip of matching precise inner diameter that fits over the outer diameter of the retainer block, thereby achieving virtually perfect coaxial alignment of these parts with one another. The entrance and exit electrodes each have a central aperture through which ions are focused along the central axis of the QMA. The precise coaxial alignment of the entrance and exit electrodes assures concentric positioning of their respective apertures with the central axis. The detector for collecting selected ions from the mass filter is positioned within, and shielded by, a cylindrical extension of the exit aperture. The QMA includes a hot filament ion source with special filaments mounted on a plate of special shape that fits into the end of the electron repeller cylinder thereby ensuring that a critically small gap between the filament supports and the electron repeller is not bridged.

19 Claims, 4 Drawing Sheets

QUADRUPOLE MASS SPECTROMETER ASSEMBLY

BACKGROUND OF THE INVENTION

1. Technical Field of the Invention

The present invention generally relates to the field of quadrupole mass spectrometers and, more specifically, to designs to enable precision assembly, simply and reliably, especially for small quadrupoles with filter rods less than 2" long.

2. Description of the Prior Art

Quadrupole residual gas sensors, or quadrupole mass analyzers (QMA) are well known in the art and derive from the proposal of W. Paul in 1958. Since that time, there have been many commercial implementations. In his book entitled "Quadrupole Mass Spectrometry and its Applications" (©1995, American Institute of Physics, AIP Press), Peter H. Dawson summarizes much of the theory, experience and practice of quadrupole mass spectrometers and related instrumentation.

A quadrupole mass analyzer traditionally comprises an ion source, a quadrupole mass filter, and a detector, which are physically connected to each other in that order and function in that order (FIG. 1). The ion source serves to form ions of the neutral gas molecules present in the ion source and pass them through a narrow aperture to the mass filter which permits only ions of one specific mass-to-charge ratio to pass through it along the central axis through a narrow aperture to the detector. The charge that arrives at the detector is measured and is approximately proportional to the pressure of the gas species in the ion source that form that specific mass-to-charge ratio at that time. In this way, the quadrupole mass analyzer can be used to indicate the partial pressure of a particular gas species.

Typically, the mass filter can be tuned so that any mass-to-charge ratio ion within a broad range can b e measured. Thus, a QMA is typically used to monitor, sequentially, the partial pressures of a number of different gases that might be in the ion source of the analyzer. The precise behavior of the mass filter to achieve this function with good selectivity and sensitivity is somewhat complex and not the subject of this patent. However, it can be summarized as involving the interaction of combined RF and DC fields that establishes a trapping, focusing trajectory through the filter for one particular mass-to-charge ratio ion, while destabilizing and defocusing all others. In practice, the RF frequency is usually fixed, and the ratio of the RF and DC fields is also fixed to achieve a particular resolution and sensitivity for a wide range of ions. Ions of a specific mass-to-charge ratio are then selected by varying the magnitude of the RF and DC fields.

To be of practical value as a partial pressure sensor, there are several critical constraints on the mass filter. Principally, it must provide an extremely precise electric field with virtually no defects. To achieve this, the four cylindrical rods of the quadrupole mass filter must have precisely equal and uniform cross-sections and equal lengths, be positioned precisely parallel to each other with one end of each rod precisely in a common plane perpendicular to their axes and their opposite ends in another such plane. Furthermore, viewed from one end of the rods, the four rods must be positioned to occupy precisely, the four corners of a perfect square. The point at the center of the square is on the central axis of the mass filter along which the ions are filtered. The ions must be introduced to the mass filter, and extracted from it, in very small areas around this central axis. Precise alignment of all the components is, therefore, essential for good performance.

Conventional QMAs are designed with mass filter rods approximately ¼" to ½" in diameter and 2 to 8 inches long. These QMAs are typically restricted to use in gas environments of less than approximately 1.E-4 torr. At higher pressures, the mean free path of the ions is too short compared to the length of the rods and the ions often cannot travel the length of the filter without colliding with other gas molecules, thereby reducing sensitivity. In recent years, there has been strong interest in extending the use of QMAs to higher pressures. This requires shorting the filter rods, significantly. This in turn requires the use of higher RF frequencies. The net effect of these and other constraints is that not only must the length be reduced, but the rod diameter and spacing also. A recent example of a small commercial instrument designed for higher pressures that is disclosed by Ferran in U.S. Pat. No. 5,613,294. This invention addresses many of the issues of small QMAs, including the loss of sensitivity that accompanies reducing the scale of the QMA, and further addresses itself to a method of manufacture that creates multiple quadrupole fields, parallel to each other, in one unit, making a quadrupole array mass analyzer (QAMA).

One serious difficulty with reducing the size of a QMA or QAMA to achieve better performance at higher pressure is achieving adequate precision of the parts, assembly of the mass filter, and assembly of the entire unit. Reducing a critical component to $1/10^{th}$ of the conventional size also requires reducing the production and assembly tolerances to $1/10^{th}$ of conventional levels. The practical effect of inadequate precision of an assembly such as disclosed by Ferran is addressed by Chutjian, et. al. in U.S. Pat. No. 5,719,393, which describes a manufacturing technique to improve QAMA mass filter assembly precision and corresponding performance. However, such QAMA designs employ a relatively large number of parts that must be aligned very precisely.

The present invention is directed to a design that facilitates the manufacture and assembly of a QMA, especially a small QMA, through a minimum number of parts that are substantially self-aligning. It requires virtually no assembly alignment equipment to achieve QMA units of consistently high precision and excellent performance.

The mass filter rods of conventional, large QMAs are typically supported at two or three places along their length. This is mechanically appropriate to ensure proper alignment the relatively long rods. Even the smaller QAMA disclosed by Chutjian, et. al. employs end mounting of the filter rods. Typically, multiple support mounts require special alignment fixtures and alignment procedures to achieve filter assembly to the required precision. It is a further object of this invention to eliminate this need.

In conventional QMAs, the ion source utilizes a hot filament to generate electrons that ionize the ambient gases. The filament power necessary to achieve high sensitivity in a QMA generates significant heat that must be conducted or radiated away. Furthermore, the RF losses in the dielectric supports at the ends of the rods produce more heat. The heat generated at the ion source side of the mass filter must be transferred across the mass filter region to get to the detector side of the mass filter and then to the vacuum mount and ultimately the vacuum chamber. Generally, conventional QMA designs include the mass filter rods as significant conductors of this heat. This creates a thermal gradient from one end of the mass filter to the other, often on the order of 100° C. from one end of the rods to the other. Using common materials such as stainless steel for the rods and ceramic for the rod supports, this resulting thermal expansion changes the alignment of the rods from the entrance end to the exit end to a degree that is significant compared with the other tolerances of a precise QMA assembly.

Reducing this thermal distortion has been partially addressed in the work of Waki (U.S. Pat. No. 5,459,315). In that patent, Waki describes a particular way of sinking the heat generated in the dielectric supports by directly shunting it away from the dielectric. It is a further object of this invention to moderately reduce heat generation in the dielectric filter rod support and to virtually eliminate the filter rods as heat conductors, thereby eliminating thermal expansion gradients along the mass filter.

It is well known, as noted in “Quadrupole Mass Spectrometry and Its Applications” by Dawson, that the ideal cross section for a QMA mass filter electrode rod is hyperbolic. But for reasons of practical manufacture, most commercial QMAs are made using rods of circular cross section. Use of a hollow circular cylinder electrode that coaxially surrounds the mass filter reduces the sixth-order field distortion of circular rods when the inner radius of that hollow electrode is 3.54 $r_0$, where $r_0$ is the distance between the central axis and the nearest point on any rod and where the radius of each circular rod is 1.1468 $r_0$. It is a further object of this invention to provide such a precise distortion-canceling field, using the minimum number of parts, without a separate electrode component or shield.

Reducing the size of a QMA and extending its application to higher pressure creates other problems also. Among these problems is a likely reduction in operating life of the ion source filament and the need for easy, more frequent replacement. It is common for QMAs to incorporate filament designs that facilitate low cost manufacture and relatively easy field replacement. However, conventional designs are typically inadequate, when reduced in scale, as required for a small high-pressure QMA. For optimum performance a reduced scale ion source can demand free spaces that are only a small fraction of a millimeter between replaceable components. It is a further object of this invention to provide an ion source with a low-cost filament assembly that allows for simple filament replacement while maintaining sub-millimeter clearances.

SUMMARY OF THE INVENTION

The present invention provides a high performance quadrupole mass analyzer that is particularly well suited to being manufactured in a small size, such as for operation at high pressures, and at reasonable cost due to: a minimum of components; use of circular geometry, which can be readily machined with very high precision, in virtually all parts; self-aligning interfaces between the parts, which ensure simple high precision assembly; high thermal stability through a unique filter mounting configuration; can incorporate integral field-distortion canceling; and an ion source design that ensures maintaining a critical gap when filaments are replaced.

The invention incorporates many of the standard features of conventional QMAs, including: a hot filament, electron-impact ion source; a quadrupole mass filter of four parallel cylindrical rods of either hyperbolic or circular cross section; an ion detector which can be of the faraday cup and/or electron multiply types; and a vacuum sealing and mounting flange with electrical feed-throughs. The operation of the invention is conventional in it that: it uses electric current to heat the filament and emit electrons that are accelerated through a central grid to the center of the ion source, thereby gaining the energy to ionize molecules of the ambient vacuum; it focuses and extracts these ions through an entrance aperture into the quadrupole mass filter region; it uses RF and DC fields appropriately applied to opposing pairs of filter rods to achieve a varying electrical field that retains and focuses ions of a selected mass-to-charge ratio while rejecting all others; and it focuses the ions selected by the mass filter through an exit aperture to the detector which collects the current. As with other QMAs, measurement of the collected current is used as an indication of the partial pressure of the gases that formed the ions of the selected mass-to-charge ratio.

The designs of all components of the invention are uniquely interrelated to achieve the objective of precise concentric alignment throughout the QMA. The design of the insulating support for the mass filter rods and its interface to the entrance and exit electrodes creates precise alignment and orientation of the mass filter assembly in all six degrees of freedom with respect to the central axis and the entrance and exit apertures: x, y and z axes, angle in the x-z plane, angle in the y-z plane, and rotation around the z axis.

The design of the insulating support for the mass filter rods and its interface to the entrance and exit electrodes also couples heat from the ion source to the exit electrode and then to the vacuum mount without conduction through the filter rods.

The design of the exit electrode further couples the mass filter assembly to the vacuum mount and shields the detector from electrical interference.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and sequence of steps of constructing and operating the invention in connection with the illustrated embodiments. It is understood, however, that the same or equivalent functions and sequences may be accomplished by different embodiments that are also intended to be encompassed within the spirit and scope of the invention.

Quadrupole residual gas sensors, or quadrupole mass analyzers (QMA) are well known in the art and derive from the proposal of W. Paul in 1958. Since that time, there have been many commercial implementations. In his book entitled "Quadrupole Mass Spectrometry and its Applications" (©1995, American Institute of Physics, AIP Press), Peter H. Dawson summarizes much of the theory, experience and practice of quadrupole mass spectrometers and related instrumentation.

Figure 1:
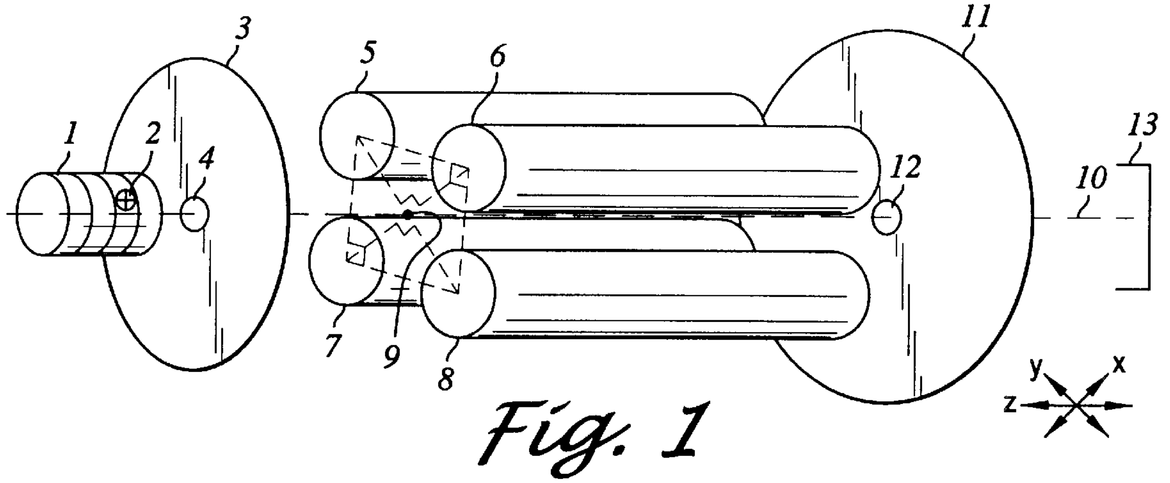
FIG. 1 is a perspective view of the fundamental elements of a conventional quadrupole mass analyzer.

A quadrupole mass analyzer traditionally comprises an ion source, a quadrupole mass filter, and a detector, which are physically connected to each other in that order and function in that order (FIG. 1). The ion source 1 serves to form ions 2 of the neutral gas molecules present in the ion source and pass them through narrow aperture 4 to the mass filter 5-8, which permits only ions of one specific mass-to-charge ratio to pass through it along the central axis 10 through narrow aperture 12 to the detector 13. The charge that arrives at the detector is measured and is approximately proportional to the pressure of the gas species in the ion source that form that specific mass-to-charge ratio at that time. In this way, the quadrupole mass analyzer can be used to indicate the partial pressure of a particular gas species.

Figure 2A:
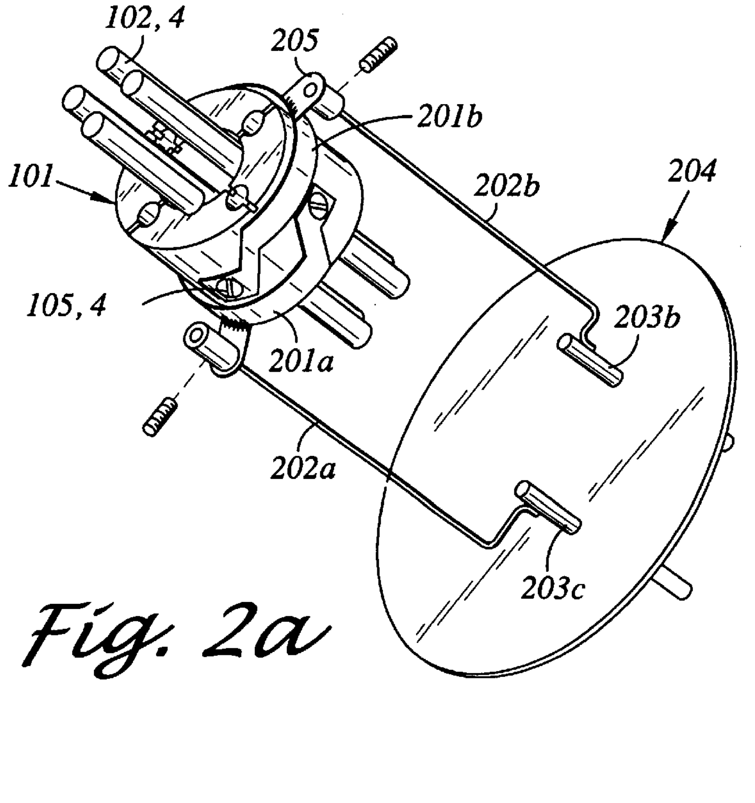
FIG. 2*a* is an enlarged view of the retainer block assembly shown at FIG. 2.
Figure 2:
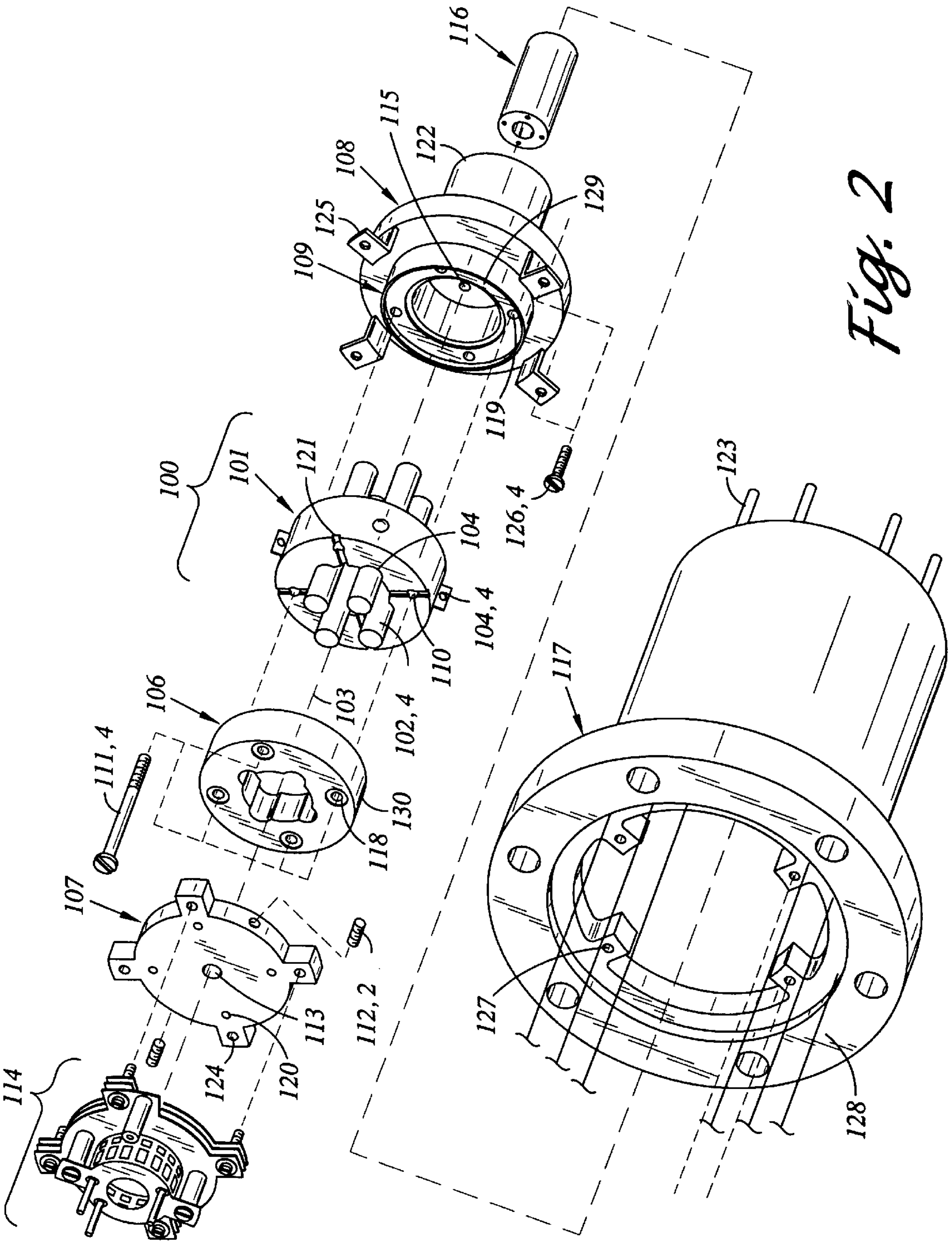
FIG. 2 is an exploded view of a quadrupole mass analyzer formed in accordance with the present invention.

A quadrupole mass analyzer (QMA) of the present invention is shown in FIG. 2. The single, round, cylindrical, insulating retainer block 101 is the key to the entire QMA assembly. In the preferred embodiment, the retainer block is composed of a high quality dielectric, such as alumina or quartz, with good structural strength, dimensional stability, and good thermal conductivity. The quadrupole mass filter section 100 is made of four non-magnetic, conductive, cylindrical rod electrodes 102 and the retainer block 101. In the preferred embodiment, the rods are composed of a material such as 304 stainless steel or Invar™. The retainer block 101 has a central axis of symmetry 103 that defines the central axis of the entire QMA. The rods are held in place at the mid-point of their length on the inner surface of the retainer block in rod receiving channels 104 extending along the inner surface of the retainer block (see FIG. 2*c*). The channels are located so as to position the rods precisely parallel to each other and equidistant from the central axis of symmetry 103. The retainer block channels are located at 90-degree intervals around the central axis of symmetry so that each channel/rod is precisely equidistant from the two adjacent rods and the locations of the channels/rod ends form a perfect square. The rods are secured to the retainer block 101 by radial fasteners, such as screws 105, which travel through screw channels from the outer surface 132 to the channels 104 formed on the inner surface 133 of the retainer block 101. Radial holes may be formed in the rod electrodes 102 to receive and engage the screws 105, thereby holding the filter rods in place within channels 104. Due to tight tolerances on the diameter of the screw channels 131 and the radial fasteners 105, fastening at the mid-point of the rods causes the rods to be coplanar with each other.

It will be recognized that there are alternate means of securing the rods 102 in place without departing from the broader aspect of the present invention. For example, the construction may include the use of a threaded stud projecting from the rod and engaging a threaded coupling to the outer surface of the retainer block. The fastener means may further be implemented as a spring-clip that is pressed onto the fastener shaft at the outer surface of the retainer block, thereby pulling the fastener shaft outward tightly.

The fastener may also serve as the sole electrical connection to the rod. The fastener may be disposed in electrical communication with a conductor strap 201*a*, 201*b*, as shown in FIG. 2*a*, that extends around the outside of the retainer and attaches to the opposing rod. The strap is omitted from FIG. 2 to avoid it obscuring other features of that figure. The strap is further in electrical connection with RF lead 202*a*/202*b*, that in turn connects to a conductive pin 203*a*, 203*b*, which extends through the vacuum feed-through 204, thereby facilitating electrical communication between the rods and an external power supply that drives the filter assembly with the required voltages to form the desired quadrupole field. In the preferred embodiment, the straps are the identically shaped and made of stainless steel, photographically patterned and chemically etched. For one strap, the block for connecting the strap to the RF lead is on one face of the strap, while the opposite face is used for the other strap.

Fastening the rods 104 only at the mid-point prevents the rods from being significant thermal conductors from the ion source to the vacuum mount. Equally, the mid-point mounting ensures that heating of the rods from dielectric and resistive losses will not create a significant thermal gradient along the rods because there are no thermal sources or sinks at the ends of the rods.

In the preferred embodiment, the retainer block 101 is ⅓ the length of the rods 104. Alternate embodiments anticipate block lengths of approximately 0.2 to 1.1 times the length of the rods.

The outer surfaces of the retainer block serve as the mounting references for the self-aligning assembly of the filter 100 to the entrance electrode 130 and to the exit electrode 108. The retainer block is formed to have a precision outer diameter that is the coaxial reference for the assembly, fitting just inside matching precision lips 109 formed on the faces of the exit and entrance electrodes. The end faces of the retainer block are precisely flat and perpendicular to the central axis 103. These faces seat against the corresponding faces of the entrance and exit electrodes, which are also precisely perpendicular to the central axis. The retainer has four holes 110 through its length positioned at 90-degree intervals around the central axis, midway between the radial holes for the rod fasteners. These are for the main assembly screws 111. While two screws would suffice, four are preferred for even clamping. Finally, the retainer block 101 has four radial grooves 121 on each end face to permit trapped gases to escape during evacuation of the QMA.

In the preferred embodiment, the entrance electrode 130 is comprised of guide 106, which engages extraction plate, or cap 107. Cap 107 is preferably formed to have a precision inner diameter that fits snugly over the outer diameter of guide 106, with one or two radial set-screws holding it in place. The entrance electrode 130 can be made as a single high precision piece with recesses formed in the face of the cap 107 to facilitate passage of the main assembly screws 111. In this embodiment, the entrance electrode 130 serves as the mechanical base for the ion source components attaching at tapped holes 124. To facilitate removal of the ion source for cleaning and replacement, it is preferred that the ion source be separable from the QMA. Thus, it requires only the loosening of the set screw(s) 112 to remove the entire ion source 114 while keeping the remainder of the QMA intact.

Guide 106 has four holes 118 through its length, corresponding to those in the retainer block 101, counter bored on the face toward the ion source 114 to recess the heads of the screws 111. Cap 107 has four small vent holes 120 to relieve any trapped gases during evacuation of the QMA. In the preferred embodiment, the entrance electrode 130 is formed of 304 stainless steel, but many non-magnetic metals can be used with good success.

The entrance electrode 130 serves four primary functions: to provide the focusing entrance aperture 113; to be the mechanical base of the ion source 114; to press the retainer block 101 onto the exit electrode 108; and to be the heat path from the ion source 114 to the exit electrode 108 (via the retainer block 101). In the case of filter rods 104 with circular cross section, such as in this embodiment, the entrance electrode 130 also serves to provide a shielding electrode around the ends of the filter rods 104 of precisely the proper inner diameter to reduce certain nonideal field distortions at the central axis of the QMA. This diameter is preferably approximately 3.54 $r_0$, where $r_0$ is the distance between the central axis 103 and the nearest point on any rod 102, and where the radius of each circular rod is 1.1468 $r_0$.

The faces of guide 106 are preferably formed to be precisely flat and perpendicular to the central axis. The entrance aperture 113 is exactly centered in cap 107. To enable precise alignment of the entrance aperture to the central axis, the entrance electrode 130 has a lip of precise inner diameter on the face of guide 106, toward the retainer block 101, matching the outer diameter of the retainer block. This lip is identical to lip 109 shown on the opposing face of the exit electrode 108. Finally, the face of guide 106 with this lip has a shallow recess near the inner diameter to increase the breakdown voltage between the entrance electrode and the rods 102 across the surface of the retainer block 101. This recess is identical to recess 129 shown on the opposing face of the exit electrode.

In the preferred embodiment, the exit electrode 108 is a single part. It has four tapped holes 119 through its length, corresponding to those in the retainer block 101, to receive screws 111. In the preferred embodiment, the entrance electrode is formed by 304 stainless steel, but many non-magnetic metals can be used with good success.

The exit electrode 108 also serves four primary functions that mirror those of the entrance electrode 130; to provide the shielding exit aperture 115 for ions entering the detector; to be the base for mounting the mass filter; to be the mount of the mass filter 100 and ion source 114 to the vacuum mount 117; and to be a heat path from the ion source 114 and filter 100 to the vacuum mount 117. The exit electrode 108 further comprises a hollow cylindrical extension 122 to provide a fifth function—to shield the detector from any electrical noise emitted by the other feed-through pins 204 and leads 203. Like the entrance electrode 130, in the case of filter rods 104 having a circular cross section, the exit electrode 108 also serves to provide a shielding electrode around the ends of the filter rods 102 of precisely the proper inner diameter to reduce the same non-ideal field distortions at the central axis of the QMA.

The end faces of the exit electrode 108 are precisely flat and perpendicular to the central axis. The exit aperture 115 is axially centered. To enable precise alignment of the exit aperture to the central axis 103, the exit electrode 108 has a low lip 109 of precise inner diameter matching the outer diameter of the retainer block. Furthermore, this face has a shallow recess 129 near the inner diameter to increase the breakdown voltage between the exit electrode and the rods 102 across the surface of the retainer block 101. Four radial support arms 125 complete the features of the exit electrode 108 and provide the points of attachment to the vacuum mounting flange 117.

It is an aspect of this invention that, by virtue of the design and precision of its parts, the filter region can then be assembled with very high precision in this simple manner: 1) set the filter assembly 100 on the exit electrode 108, pressing it carefully into the raised lip 109 with holes 110 over holes 119; 2) set guide 106 on the retainer block 101, carefully pressing its raised lip over the retainer block; 3) insert and tighten the four main assembly screws 111; and 4) when the ion source 114 parts are all assembled on cap 107, it is set onto guide 106 and secured in place by screws 112.

The detector 116 is screwed directly onto a stud at the center of the electrical feed-through 123 in the base of vacuum mounting flange 117. The entire QMA is mounted in vacuum mounting flange 117, with the shield extension 122 surrounding the detector 116 by aligning the support arms 125 with tapped holes 127 and securing with screws 126. In the preferred embodiment, the vacuum mounting flange 117 is of the copper gasket sealed type. All electrical leads 128 from the feed-through are routed between the support arms 125 in the gap between the outer edge of the exit electrode 108 and the inner diameter of the vacuum mount 117. The leads extend up the side of the mass filter region to their respective connection points.

Figure 2B:
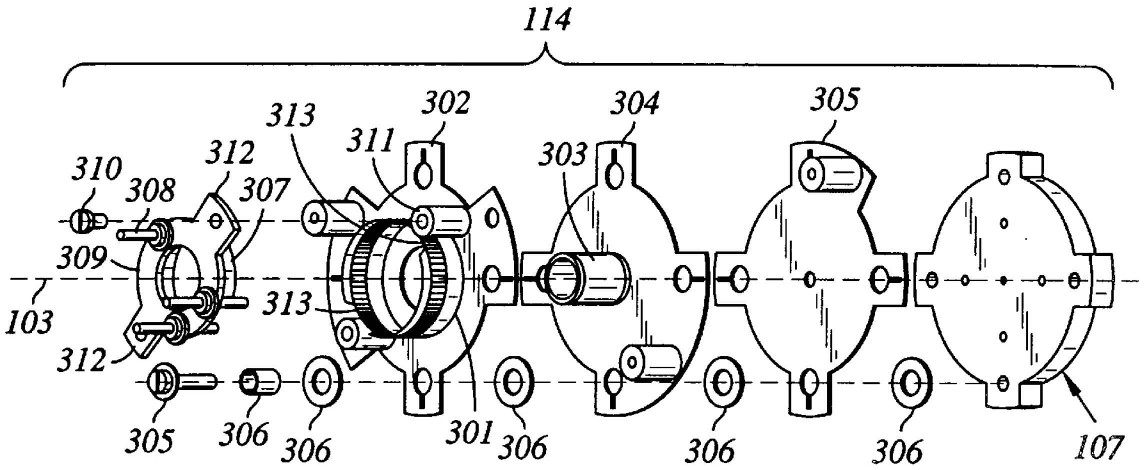
FIG. 2*b* is an enlarged view of the ion source shown at FIG. 2.
Figure 2C:
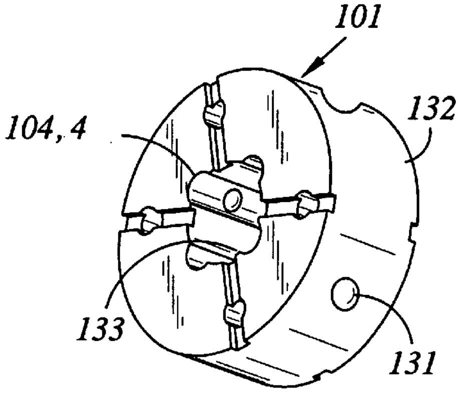
FIG. 2*c* is a perspective view of the retainer block in isolation.

The ion source 114 shown in FIG. 1 is detailed in FIG. 2*b*. It shares many features in common with conventional QMAs. The electron reflector 301, a conductive circular cylinder, surrounds the ion source, aligned with the central axis 103, and is mounted on a plate 302. Within the electron reflector is the ion cage 303, another conductive circular cylinder screen aligned with the central axis 103 that is smaller in diameter and substantially transparent and is mounted to ion cage plate 304. The extractor plate 305 is interposed between the ion cage plate 304 and the entrance electrode cap 107. All these plates are held onto cap 107 by four screws 305 with insulating spacers 306 between them. Each plate has a connector to attach it to a lead wire 128 from the feed-through 123 (FIG. 2).

There is a filament wire loop 307 around the central axis disposed between the electron reflector 301 and the source cage 303 cyclinders. The filament wire is supported at its ends and middle by filament pins 308. The end pins are in turn mechanically, but not electrically, connected to the filament plate 309. The middle filament pin is connected to the filament plate both mechanically and electrically. This arrangement creates two independent filaments from one piece of wire, one from each end pin to the middle pin. The filament plate is mechanically and electrically connected by screws 310 to two tapped posts 311. Each end pin has a connector to a lead wire 128 from the feed-through 123. The filament is heated to emit electrons by passing an electric current through it between an end pin and the middle pin.

In a small ion source, to achieve the desired electron trajectories from the filament to the source cage, the filament is preferably close to the electron reflector. Typically, the filament pins are less than ½ millimeter from the electron reflector. Since the filaments need to be replaced periodically as the QMA is used, some means is required to ensure that this can be done without a filament post touching the electron reflector. In the present invention, this is achieved by fabricating the filament plate as a thick disc with a diameter that just fits inside the open end of the electron reflector cylinder. In this way, the plate cannot be shifted over to permit a pin to touch the electron reflector because the edge of the plate contacts the inside of the reflector first to ensure maintaining the critical gap. Furthermore, in the preferred embodiment, two tabs 312 extend from the filament plate 309 for attachment to the reflector plate posts 311. The end of the electron reflector cylinder 301 is formed to include notches 313 to allow tabs 312 to extend through reflector cylinder 301. The two tabs 312 may be formed to have dissimilar widths to ensure proper orientation when installing.

Figure 3:
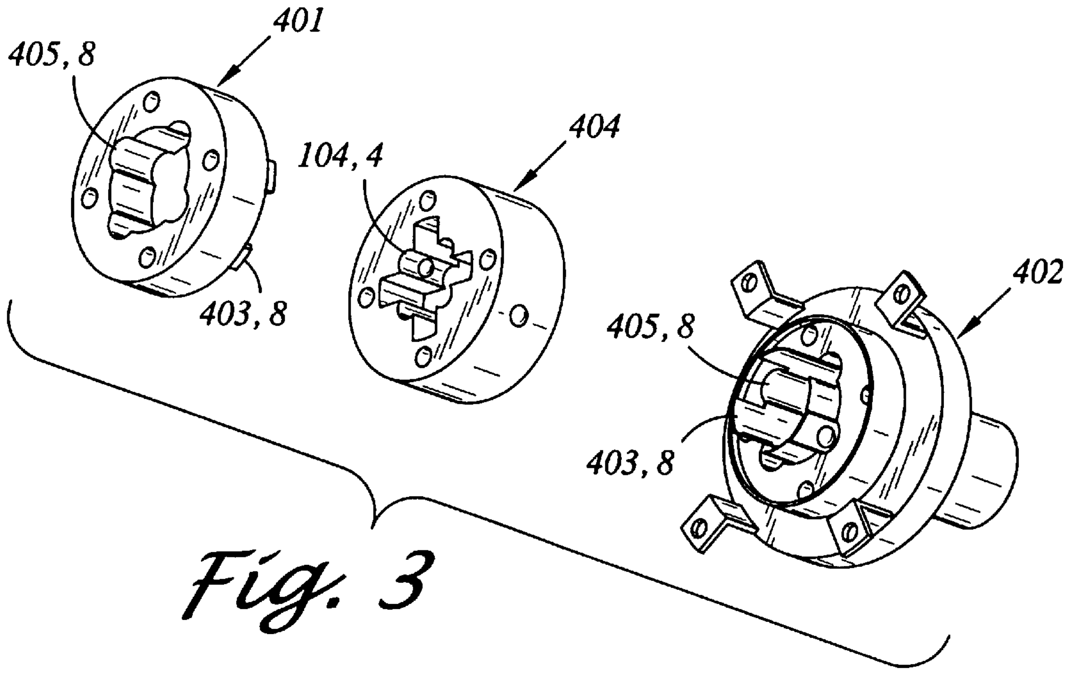
FIG. 3 is an alternate embodiment of the invention having inner conductive extensions formed in the entrance and exit electrodes, and meeting within the retainer block.

FIG. 3 shows a variant of the invention in which certain details of the shape of the of the entrance electrode 401, the exit electrode 402, and the retainer block 404 improve peak shape in the case of filter rods 102 with circular cross section. The improvement is due to extension 403 of the inner diameter surfaces of these electrodes to cover the retainer block in the regions between the filter rods. Ideally, the extensions meet each other at the mid-point of the length of the retainer block thereby presenting a continuous surface of 3.54 $r_0$ to the central axis through the spaces between the rods. This also requires a more complex inner shape for the retainer block 404 to provide clearance for the extensions 403.

A further refinement of the embodiment depicted in FIG. 3 is the incorporation of scallops 405 in the surface of the inner diameter of electrode guide 401, and electrode 402. These scallops increase the breakdown voltage from the entrance and exit electrodes to the rods 102 across the surface of the retainer block 404 instead of a recess like 129. The scallops have the further advantage of reducing the capacitance between the rods and the entrance and exit electrodes, thereby reducing the power required to achieve a given level of voltage on the rods. Therefore, this embodiment is for a higher cost, higher performance version of the invention.

Figure 4:
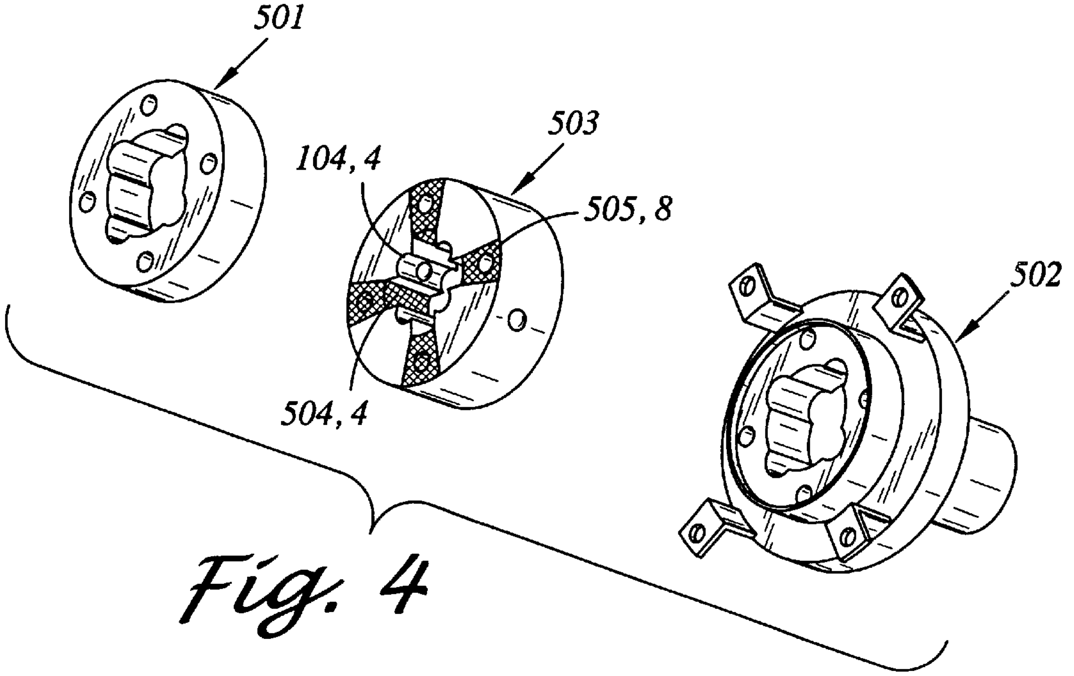
FIG. 4 is a further alternative embodiment of the invention wherein metalized surfaces are formed within the retainer block.

FIG. 4 depicts an alternative method of achieving the improved performance of the embodiment of FIG. 3. In FIG. 4, the entrance 501 and exit 502 electrodes have the functional features described for versions 401 and 402 except that the extensions 403 are not present. This simplifies the manufacture of 501 and 502. In the embodiment of FIG. 4, tile retainer block 503 itself provides the 3.54$r_0$ conductive surface by shaping the regions 504 between the rod supports to have a radius of 3.54 $r_0$ and then metalizing those regions. This metalization extends 505 onto both faces of the retainer block 503 to connect electrically with the entrance and exit electrodes when the QMA is assembled. This effectively extends the distortion-canceling field of the inner diameter of the entrance and exit electrodes across the inner surface of the retainer block. The metalization can be produced by common ceramic processing practices such as applying conductive paste to the desired surfaces of the retainer block and then heating it ("firing").

Yet other methods of achieving a conductive surface across the face of regions 504 will be apparent to those skilled in the art and are incorporated into this invention. Among these are metal foil strips pressed into regions 504 and folding over the face of the retainer block.

What is claimed is:

1. A quadrupole mass spectrometer sensor of self-aligning design comprising:

a hot-filament, electron-impact ion source for generating ions of the ambient gas in which the sensor is placed;

a quadrupole mass filter assembly for selecting ions of specific mass-to-charge ratios from among said ions, the assembly comprising a central axis, a plurality of equal, non-magnetic, conductive, cylindrical filter rods and an insulating retainer block, said retainer block being formed as an annular body having a plurality of axial, rod receiving grooves disposed on the inner surface thereof, the rods being engaged to the grooved inner surface for the sole support thereof, wherein said cylindrical insulating retainer block has a circular outer diameter that is substantially coaxial with the central axis, and has a symmetric inner surface that is substantially coaxial with the central axis, and has two end faces that are substantially perpendicular to the central axis;

a detector for collecting the charge of said selected ions;

a cylindrical entrance electrode having an entrance aperture that defines the area through which said ions enter said quadrupole mass filter from said ion source wherein said entrance electrode has a mounting face and lip formed thereon for receiving the retainer block and positioning the entrance electrode in axial alignment therewith; and a cylindrical exit electrode having an exit aperture that defines the area through which said selected ions exit said quadrupole mass filter to said detector wherein said exit electrode has a mounting face and a lip formed thereon, for receiving the retainer block and positioning the exit electrode in axial alignment therewith.

2. The quadrupole mass spectrometer as recited in claim 1 wherein said ion source, entrance aperture, filter assembly, exit aperture, and detector are aligned along a common central axis so that ions from the ion source pass through the entrance aperture into and through the filter assembly and through the exit aperture to the detector along the common central axis.

3. The quadrupole mass spectrometer as recited in claim 2 wherein said filter rods comprise four equal, non-magnetic, conductive, cylindrical electrode rods mounted at the mid-point of their length to the grooved inner surface of the retainer block.

4. The quadrupole mass spectrometer as recited in claim 3 wherein the filter rods are disposed pararle to each other, parallel to and equidistant from the central axis, and equidistant from adjacent filter rods.

5. A quadrupole mass spectrometer sensor according to claim 4 where $r_0$ is the distance from the common central axis to the inner surface of the mass filter rods facing the common central axis, and the mass filter rods are of cylindrical cross-section of radius approximately 1.1 $r_0$ to 1.2 $r_0$, and the cylindrical inner surface of the entrance and exit electrodes has a diameter of approximately 3.4 $r_0$ to 3.8 $r_0$.

6. A mass spectrometer according to claim 3 further including hot-filament, electron-impact ion source engageable to the entrance electrode, the ion source comprising:

an outer, conductive, cylindrical electron reflector coaxial with the axis of symmetry;

an inner, conductive, cylindrical electron reflector coaxial with the axis of symmetry;

an inner, conductive, cylindrical ion cage coaxial with the axis of symmetry and substantially transparent to electron flow, said ion cage extending within the electrode reflector;

at least one filament wire for electron emission disposed between the electron reflector and the ion cage;

at least one conductive, focussing extraction plate, having an aperture formed therein, said extraction plate being disposed adjacent the electron reflector cylinder, perpendicular to the axis of symmetry, with the aperture aligned concentric with the axis of symmetry; and a filament mounting plate having an outer diameter disposable within the cylindrical reflector, and having conductive posts extending therefrom, said filament extending in an arc extending between the conductive posts intermediate the ion cage and the reflector.

7. A quadrupole mass spectrometer according to claim 6 further comprising at least one fastener extending radially through the extraction plate and engageable to the entrance electrode, said fastener being disengageable from the entrance electrode to facilitate removal of the ion source without disassembly of any portion of the exit electrode, entrance electrode and retainer block.

8. A quadrupole mass spectrometer according to claim 6 wherein the conductive posts are disposed radially inward from the filament plate outer diameter to prevent contact of the mounting posts and the cylindrical reflector.

9. A quadrupole mass spectrometer sensor according to claim 1 where the retainer block, entrance and exit electrodes each have conductive cylindrical inner surfaces extending adjacent the filter rods.

10. A quadrupole mass spectrometer according to claim 9 wherein the conductive inner surfaces are formed as metalized patterns, cooperatively extending adjacent the filter rods and beyond.

11. A quadrupole mass spectrometer according to claim 10 wherein the metalized patterns are operative to facilitate cancellation of a distortion field about the filter rods.

12. A quadrupole mass spectro meter sensor according to claim 9 where the inner surfaces of the entrance and exit electrodes are formed to extend axially toward and into the retainer block to substantially meet each other inside the retainer block, thereby forming four conductive surfaces extending substantially continuous from the entrance electrode to the exit electrode.

13. A quadrupole mass spectrometer to claim 12 where the mounting plate has at least one mounting tab extending radially outward beyond its outer radius and the electron reflector has at least one tab receiving notch formed therein, for engaging the mounting plate and aligning the reflector therewith.

14. A quadrupole mass spectrometer according to claim 13 where the mounting plate is formed to have two mounting tabs of substantially different widths, and the electron reflector has notches of correspondingly different widths.

15. The quadrupole mass spectrometer according to claim 1 wherein the exit and entrance electrodes are each provided with conductive elements extending along the inner surfaces thereof, and into the retainer bloc for electrical communication therebetween.

16. The quadrupole mass spectrometer according to claim 15 wherein the conductive elements are operative to facilitate cancellation of a distortion field about the filter rods.

17. A quadrupole mass spectrometer sensor according to claim 15 where the retainer block is formed to have an inner surface that is concentric with and having the same radius as inner surfaces of the entrance electrode to the exit electrode.

18. A quadrupole mass spectrometer sensor according to claim 1 where the detector is a faraday cup.

19. A quadrupole mass spectrometer according to claim 1 wherein the retaining block entrance electrode and exit electrode are matable for axial alignment therebetween, and to define a distance between entrance and exit apertures, and between the ends of the rods and the entrance and exit apertures.

* * * * *